United States Patent [19]

Braukmann

[11] 4,245,667

[45] Jan. 20, 1981

[54] SAFETY VALVE

[75] Inventor: Bernhard W. Braukmann, Mosbach, Fed. Rep. of Germany

[73] Assignee: Braukmann Armaturen AG, Rothrist, Switzerland

[21] Appl. No.: 860,063

[22] Filed: Dec. 13, 1977

[30] Foreign Application Priority Data

Dec. 24, 1976 [DE] Fed. Rep. of Germany ....... 2658721

[51] Int. Cl.³ .................... F16K 17/18; F16K 15/06
[52] U.S. Cl. ................. 137/493; 137/454.5; 137/540; 137/543.13
[58] Field of Search ............ 137/540, 454.5, 542, 137/543.13, 536, 454.2, 493; 251/360, 335 A

[56] References Cited

U.S. PATENT DOCUMENTS

| 2,279,002 | 4/1942 | MacNeil | 137/540 |
| 2,603,231 | 7/1952 | Birkhemeier | 137/540 X |
| 2,859,767 | 11/1958 | Tschudi et al. | 251/360 X |
| 3,422,840 | 1/1969 | Bryant et al. | 137/540 X |
| 3,545,476 | 12/1970 | Dykzeul et al. | 137/454.2 X |
| 3,789,870 | 2/1974 | Keller | 137/454.5 |
| 3,797,511 | 3/1974 | Selby | 137/542 X |
| 3,825,225 | 7/1974 | Demi | 137/454.5 X |
| 3,835,646 | 9/1974 | Ranft et al. | 251/335 A |

Primary Examiner—William R. Cline
Attorney, Agent, or Firm—William T. Howell

[57] ABSTRACT

A safety valve has a housing with an inlet, outlet and a threaded opening carrying a walled unit which is sealingly removable from the housing; the portion of the unit extending into the housing is apertured to permit flow and has a valve seat and co-operating plate to which is attached a valve stem extending through an annular diaphragm in secured relationship. The diaphragm is supported by the housing and in the portion of the unit exterior of the housing is a biasing device which acts on the diaphragm.

3 Claims, 2 Drawing Figures

SAFETY VALVE

FIELD OF INVENTION

The invention relates to a safety valve particularly for closed heating installations or water heaters having a pressure regulating device.

PRIOR ART

Safety valves of this kind are used especially in closed heating installations and pressure tight water heaters. They are subject to strict requirements imposed by technical monitoring organizations. Among other things, they must be adjusted to the correct response pressure in the plant, after which they must be sealed. If there are any foreign bodies in the water flowing through the valve, for instance grains of sand, particles of weld material, swarf from thread cutting or the like, these may become trapped between the valve seat and the valve head, and, if they are not removed, the valve no longer closes properly. The resulting constant high speed jet of water at the location of the foreign body may finally damage the seat of the valve, and the whole valve assembly must be replaced. It is neither possible nor permissible to replace the upper part only, since production tolerances will make it impossible to maintain the correct response pressure.

SUMMARY OF THE INVENTION

It is, therefore, the purpose of the invention to provide a safety valve of the type mentioned at the beginning hereof, which will make it possible to replace worn parts, more particularly the valve seat and the valve head, while still retaining the correct response pressure originally set.

This purpose is achieved by means of a safety valve having an insert which may be removed relatively easily from the safety valve housing, without removing the said housing from the pipeline. Any foreign body trapped between the valve seat and the valve head may be removed or, if the valve has already been damaged, it may be replaced. The unit taken out may then be overhauled, reinstalled, and sealed, after which it may be used as a replacement unit. The invention thus makes it possible to set and seal the safety valve in the plant, and it provides a removable, and, therefore, replaceable unit. Nor is the replacement restricted to a unit with exactly the same setting.

According to one specially preferred example of embodiment of the invention, the valve seat ring is connected by means of webs or the like to the housing of the unit and is sealed in relation to the valve housing, with at least one sealing ring, the spaces between the said webs or the like constituting flow passages. The webs provide a cage through which the medium can flow from inside to outside or vice-versa, depending on the direction of flow through the valve. Arranged centrally of the said webs, or web ends, is the valve seat ring through which the medium flows initially or subsequently, depending upon the direction of flow.

It is desirable for the cage forming webs, or the like, accommodating the valve head, to be in the form of a truncated cone, the smaller diameter thereof being located at the inner end of the unit. During assembly of the unit, the valve seat ring is first of all inserted through the appropriate opening in the safety valve housing, after which the said truncated conical body is inserted with the smaller diameter in front. The extent to which the unit projects into the safety valve housing is governed by the dimensions of the said housing. Sealing is required at the valve seat ring and also in the vicinity of the element which secures the unit in the housing.

According to another configuration of the invention, it is proposed that the valve seat ring, the webs and a tubular housing part of the unit be made in one piece to form the lower part of the said unit which may preferably be injection moulded. According to another variant of the invention, however, it is also possible to make the lower part of the unit out of plastic and to embed the valve seat ring in an annular, metal valve seat, the latter being preferably injection moulded thereinto.

According to a further development of the invention, the safety valve may be in the form of a diaphragm valve, the diaphragm being clamped between a spring cover and the lower part of the unit secured to the diaphragm safety valve housing. Except for the lower part of the unit, the design of the safety valve may be conventional.

Finally, it is highly desirable for the safety valve to be in the form of an elbow valve, since this makes for a very compact unit.

DESCRIPTION OF THE DRAWINGS

An example of embodiment of the invention is illustrated in the drawing attached hereto, wherein.

DESCRIPTION OF A PREFERRED EMBODIMENT

Figure 1:
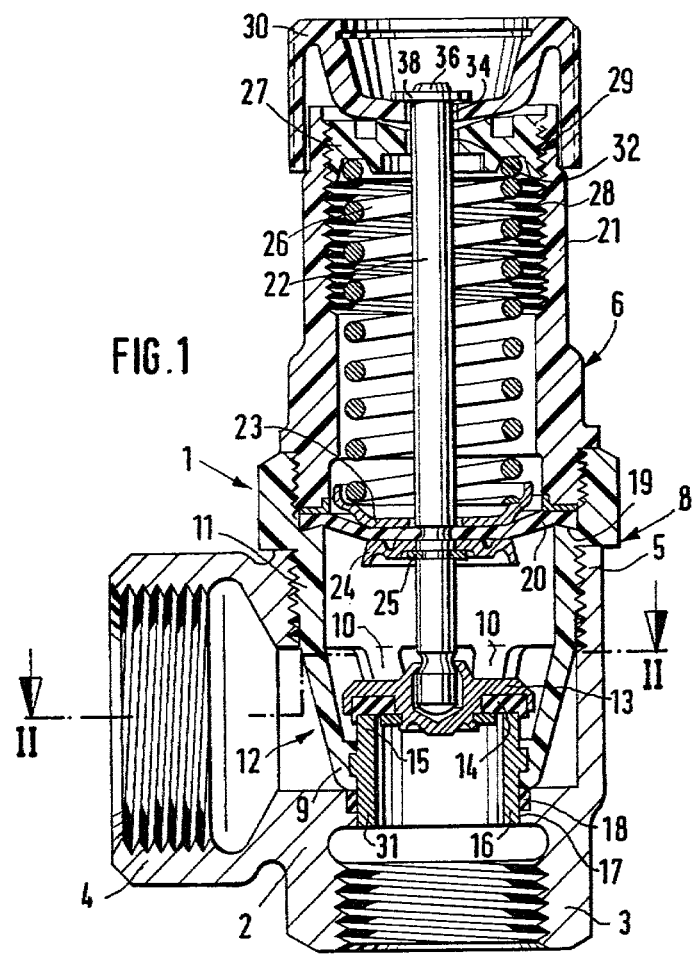
FIG. 1 is a vertical, longitudinal section through the safety valve according to the invention.
Figure 2:
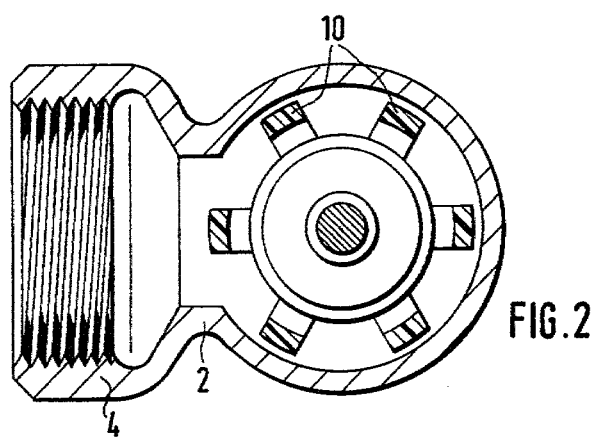
FIG. 2 is a section along the line II—II in FIG. 1.

The example of embodiment is in the form of a diaphragm safety valve 1 designed as an elbow valve. Housing 2 has two connections 3,4 at right angles to each other, for pipelines (not shown), which may be the lines running to a closed heating installation. A unit 6 is inserted into a connection 5 which may run, for example, coaxially with connection 3, the two parts being preferably united by means of a thread. A sealing element (not shown) may also be provided at this location.

Unit 6 has a lower part 8 consisting of a tubular valve seat ring 9, web 10 and an upper, tubular housing part 11. Webs 10 run from the bottom of tubular housing part 11 and terminate at the outside of valve seat ring 9. They slope in relation to each other and thus form a truncated conical cage 12 containing plate like valve head element 13 with a sealing ring 14 bearing upon valve seat 15, the latter consisting of the upper end of an insert ring 31 which is either injection moulded or cast into valve seat ring 9. Although this is not shown, valve seat ring 9 and insert ring 31 may be made in one piece. In this case, valve seat ring 9, webs 10, tubular part 11 and insert ring 31 may be made of synthetic material. In the example of embodiment, the insert ring 31 is made of metal, whereas the other parts (9,10,11) are made of plastic, preferably injection moulded or cast. Tube end 16, projecting beyond the lower ends of webs 10, engages in a bore 17 in valve housing 2. A sealed joint is achieved by means of a sealing ring 18.

Diaphragm 20 is located upon an inner shoulder 19 on lower part 8 and is secured by means of spring cover 21 which is screwed into an internal thread at the upper end of lower part 8. Valve stem 22 passes through a central aperture in the diaphragm, being secured in relation thereto by means of an upper and lower disc 23,24 and a retaining ring 25 designed as a circlip, for example. Dics 23 supports the lower end of loading spring 26, the upper end of the said spring bearing against a threaded member 27 which may be screwed into or out of a thread 28 in spring cover 21, in order to adjust the tension of the spring to the desired value. This constitutes the pressure adjusting device 29. The threaded member 27 has a central aperture 32; the valve stem 22 passes through the aperture 32 in spaced relationship therefrom. A cap-like knob 30 fits over the spring cover 21; the knob 30 has a central aperture 34 in line with aperture 32 and the valve stem 22 passes through the aperture 34 in spaced relationship therefrom. The end of the valve stem 22 projecting from the knob 30 has a conventional screw 36 and co-operating washer 38 which bears the knob 30 against the threaded member 27. With this arrangement, the knob 30 may be used to raise the valve head 13 away from the valve seat 15 and also movement of the washer 38 away from the knob 30 will visually indicate whether the valve is closed or open.

At least the essential elements of unit 6 are preferably made of plastic, but it is desirable for the valve seat to be of metal.

I claim:

1. A safety valve comprising a housing having a first opening, a second opening and a threaded opening, a walled unit adapted for removable connection from said housing by threading intermediate of its length into said threaded opening, said unit sealing with said housing to provide a walled portion extending therein and located between said first and second openings, said walled portion, inward of its threaded connection to said housing, having webs providing passageways into said walled portion with the ends of said webs, removed from said threaded opening, terminating in a ring forming an annular valve seat located in said walled portion, sealing means providing a seal between said valve seat and said second opening, a valve plate inside said walled portion operably related to said annular valve seat, an annular diaphragm in said walled unit and secured thereto at its outer edge, said annuar diaphragm forming with said valve plate and said webs a compartment in said walled portion, said annular diaphragm having an area exposed to fluid pressure in said compartment greater than the opposing area of said valve plate exposed to fluid pressure in said compartment, said passageways, said compartment and said annular valve seat when open providing a flow channel between said first and second openings, a valve stem traversing said compartment and secured at its inner end to said valve plate, said valve stem extending through said diaphragm in secured relation thereto with the other end of said valve stem supported in said housing in sliding relationship thereto, a compression spring on the opposite side of said diaphragm with respect to said valve plate, said compression spring surrounding said valve stem with one end bearing on said diaphragm to engage said valve plate with said annular valve seat, means supporting the other end of said compression spring in said walled portion, said diaphragm being responsive to a predetermined pressure exerted in said compartment by flow from said first opening to move said valve plate from said annular valve seat and said valve plate being responsive to a predetermined pressure exerted thereon by flow in the reverse direction from said second opening to lift said valve plate from said annular valve seat.

2. A safety valve according to claim 1 wherein said means supporting the other end of said compression spring is a pre-set pressure adjusting device operable on said compression spring.

3. A safety valve according to claim 1 wherein said other end of said valve stem projects outward of said housing to indicate movement of said valve plate away from said annular valve seat.

* * * * *